US012259703B2

United States Patent
Uno

(10) Patent No.: US 12,259,703 B2
(45) Date of Patent: Mar. 25, 2025

(54) CONTROL DEVICE

(71) Applicant: FANUC CORPORATION, Yamanashi (JP)

(72) Inventor: Kousuke Uno, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 286 days.

(21) Appl. No.: 17/906,976

(22) PCT Filed: Mar. 22, 2021

(86) PCT No.: PCT/JP2021/011631
§ 371 (c)(1),
(2) Date: Sep. 22, 2022

(87) PCT Pub. No.: WO2021/193496
PCT Pub. Date: Sep. 30, 2021

(65) Prior Publication Data
US 2023/0376000 A1 Nov. 23, 2023

(30) Foreign Application Priority Data
Mar. 25, 2020 (JP) .................................. 2020-054994

(51) Int. Cl.
*G05B 19/05* (2006.01)
(52) U.S. Cl.
CPC .. *G05B 19/058* (2013.01); *G05B 2219/13009* (2013.01)
(58) Field of Classification Search
None
See application file for complete search history.

(56) References Cited

U.S. PATENT DOCUMENTS

| | | | |
|---|---|---|---|
| 6,961,637 B2 * | 11/2005 | Scherer | G05B 19/4163 700/32 |
| 10,261,492 B2 | 4/2019 | Uno | |
| 11,079,741 B2 | 8/2021 | Uno | |
| 2004/0167659 A1 | 8/2004 | Scherer | |
| 2009/0228135 A1 | 9/2009 | Nakamura | |
| 2010/0030366 A1 | 2/2010 | Scherer | |

(Continued)

FOREIGN PATENT DOCUMENTS

| | | |
|---|---|---|
| CN | 101233462 A | 7/2008 |
| CN | 105373077 A | 3/2016 |

(Continued)

OTHER PUBLICATIONS

Taylor, "Understanding Quantiles: Definitions and Uses" Apr. 5, 2023, ThoughtCo, thoughtco.com/what-is-a-quantile-3126239 (Year: 2023).*

(Continued)

*Primary Examiner* — David Earl Ogg
(74) *Attorney, Agent, or Firm* — HAUPTMAN HAM, LLP

(57) ABSTRACT

A control device calculates a specified quantile in stored data relating to a load applied on a spindle, as a target spindle load, and controls a feed speed of the spindle as to a work, so that the measured load applied on the spindle is the calculated target spindle load. A user can set the target spindle load with the load on the spindle measured in a state in which the work is being stably machined as a reference.

5 Claims, 7 Drawing Sheets

(56) References Cited

U.S. PATENT DOCUMENTS

| | | |
|---|---|---|
| 2016/0048616 A1 | 2/2016 | Nagata |
| 2017/0090445 A1 | 3/2017 | French, Jr. |
| 2017/0300030 A1* | 10/2017 | Uno .................. G05B 19/4166 |
| 2018/0284720 A1 | 10/2018 | Uno |
| 2019/0369603 A1 | 12/2019 | Uno |

FOREIGN PATENT DOCUMENTS

| | | | |
|---|---|---|---|
| CN | 106475855 A | | 3/2017 |
| CN | 108693768 A | | 10/2018 |
| CN | 110554656 A | | 12/2019 |
| DE | 102019003731 A1 | | 12/2019 |
| JP | H6297296 A | | 10/1994 |
| JP | H7195256 A | | 8/1995 |
| JP | 2005205517 A | | 8/2005 |
| JP | 2015-201112 A | | 11/2015 |
| JP | 2017191536 A | | 10/2017 |
| JP | 2019149041 A | | 9/2019 |
| WO | WO1994023894 A1 * | | 10/1994 |

OTHER PUBLICATIONS

International Search Report in PCT/JP2021/011631, mailed May 25, 2021. 2pp.
Notice of Allowance in JP application No. 2021-536721, mailed Oct. 26, 2021, 5pp.

\* cited by examiner

CONTROL DEVICE

RELATED APPLICATIONS

The present application is a National Phase of International Application No. PCT/JP2021/011631 filed Mar. 22, 2021, which claims priority to Japanese Application No. 2020-054994, filed Mar. 25, 2020.

TECHNICAL FIELD

The present invention relates to a control device, and more particularly relates to a control device that controls feed speed such that a load applied on a spindle is constant.

BACKGROUND ART

There is technology that improves cutting speed and extends the life of cutting tools by controlling the feed speed such that the load applied on the spindle is constant. Varying the feed speed such that the load on the spindle is constant enables reduction in cycle time and extension of tool life. Variable control methods of the feed speed in accordance with the spindle load are conceivable, and PID control can generally be used as control for maintaining the value of an object at a constant value (PTL 1, 2, etc.).

FIG. 7 is an exemplification of a block diagram in a case of performing control to maintain the load on the spindle to be constant, by PID control. As illustrated in FIG. 7, in order to perform the aforementioned control, a control device sets a target spindle load, and thereupon acquires the spindle load detected while machining a work by a machine as a feedback value. The control device then calculates a difference $e_L(t)$ between the acquired spindle load and the target spindle load that has been set, and adjusts an override $O(t)$ relating to speed based on the calculated value.

CITATION LIST

Patent Literature

[PTL 1] Japanese Patent Application Publication No. 2017-191536
[PTL 2] Japanese Patent Application Publication No. 2019-149041

SUMMARY OF INVENTION

Technical Problem

When performing the above-described control, there is a need to decide a target spindle load that is a target value for a load to be applied on the spindle. However, setting the target spindle load to an appropriate value requires know-how acquired through a great amount of machining repeated through human effort. Further, the target spindle load that is appropriate also differs in accordance with tools used for machining, shapes of works to be machined, materials, and so forth, and accordingly needs to be set again each time.

As for a method to easily set the target spindle load, performing test machining of the work, for example, and setting the maximum value of the load applied on the spindle at that time as the target spindle load, is conceivable. However, using this method in machining in which there are machining places where the load instantaneously becomes great leads to a problem that the spindle load set as the target is too high. When giving consideration to appropriately realizing both reduction in cycle time and extended tool life in various types of machining, there is demand for rather enabling users to easily set the target spindle load with the load on the spindle measured in a state in which the work is being machined in a stable manner as a reference.

Solution to Problem

A control device according to an aspect of the present invention solves the above problem by setting a quantile specified in advance, with regard to a set of values of loads applied on a spindle that are measured when performing machining of a work, as a target spindle load. When machining a work, the load value changes in accordance with the part being machined, the form of machining, the way in which the tool comes into contact with the work, and so forth. However, the proportion of time during which a drastically large load is applied to the spindle or the load on the spindle becomes drastically small during the process time of machining one work is small. In the present invention, when measuring the load applied on the spindle during the process of machining one work as time-series data, a predetermined load or load range that is measured over a relatively long time is defined as a stable machining load. Also, a machining range in which a stable machining load is measured is defined as a stable machining portion. In the present invention, the stable machining portion is identified on the basis of the load applied on the spindle that is measured during test machining or the like, and the stable machining load measured at the identified stable machining portion can be automatically set as the target spindle load.

An aspect of the present invention is a control device that adjusts a feed speed on the basis of a load applied on a spindle when machining a work. The control device includes: a spindle load storage unit that stores data relating to the load applied on the spindle; a quantile specifying unit that specifies a predetermined quantile; a target spindle load calculating unit that calculates the quantile specified by the quantile specifying unit, in the data relating to the load applied on the spindle stored in the spindle load storage unit, as a target spindle load; a spindle load measuring unit that measures the load applied on the spindle; and a control unit that controls the feed speed of the spindle as to the work, so that the load applied on the spindle is the target spindle load.

Advantageous Effects of Invention

According to an aspect of the present invention, when controlling feed speed such that a load applied on a spindle is constant, there is no longer a need for a human to decide the target spindle load in accordance with the tool and work in advance on the basis of experience and so forth, and the load of a stable machining portion can be taken as the target spindle load.

DESCRIPTION OF EMBODIMENTS

Embodiments of the present invention will be described below with reference to the Figures.

Figure 1:
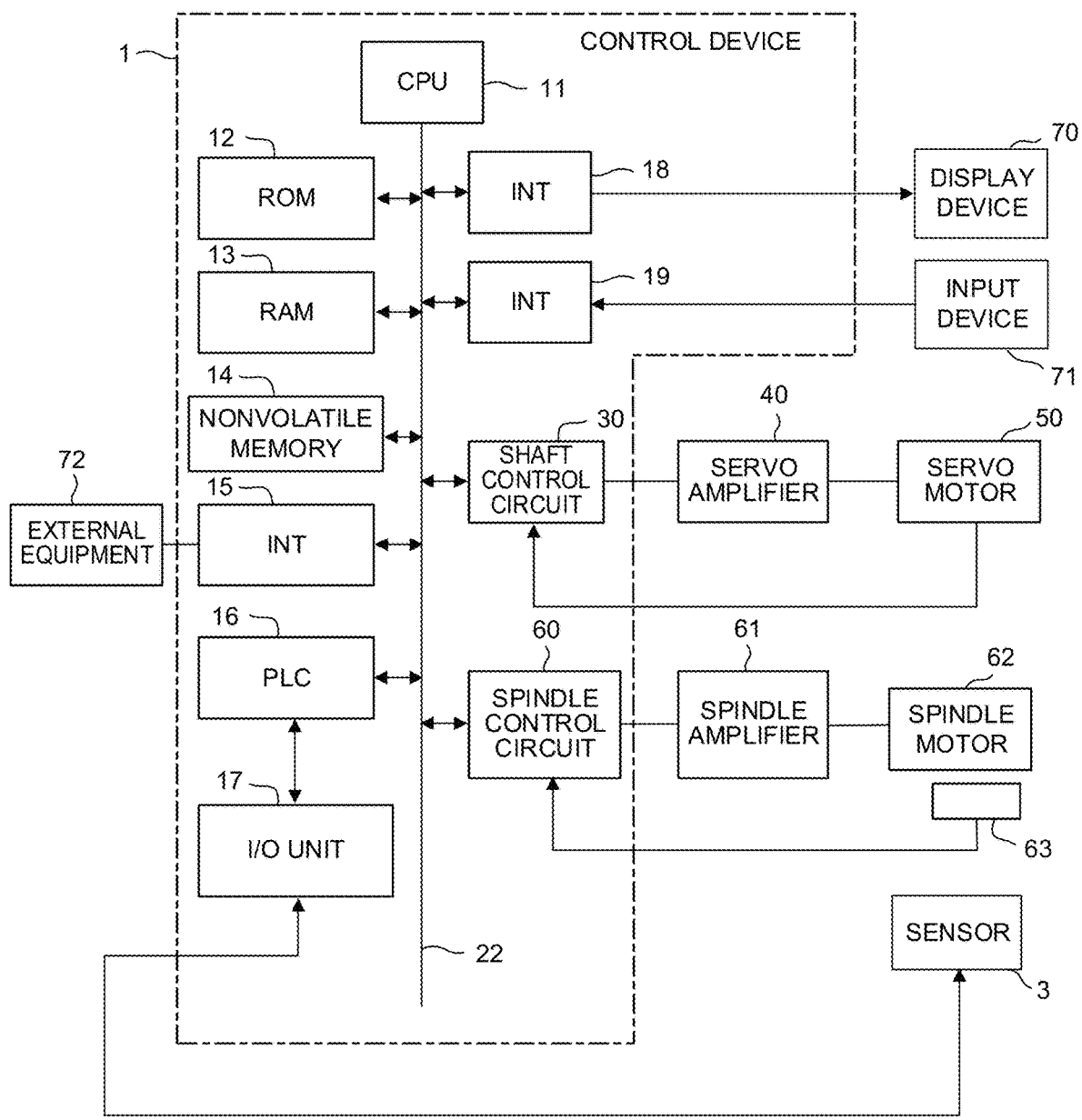
FIG. 1 is a schematic hardware configuration diagram of a control device according to an embodiment.

FIG. 1 is a schematic hardware configuration diagram illustrating principal portions of a control device according to an embodiment of the present invention. The control device 1 according to the present invention can be implemented as a control device that controls a machine tool, for example.

A CPU 11 that the control device 1 according to the present invention includes is a processor that comprehensively controls the control device 1. The CPU 11 reads out a system program stored in ROM 12 via a bus 22, and controls the overall control device 1 following this system program. Temporary calculation data and display data, various types of data that are externally input, and so forth, are temporarily stored in RAM 13.

Nonvolatile memory 14 is made up of, for example, memory backed up by a battery that is omitted from illustration, an SSD (Solid State Drive), or the like, and the stored state is maintained even after the power of the control device 1 is turned off. The nonvolatile memory 14 stores data and machining programs read in from external equipment 72, data and machining programs input via an input device 71, various types of data acquired from machine tools, and so forth, via an interface 15. The data and the machining programs stored in the nonvolatile memory 14 may be loaded to the RAM 13 at the time of execution/usage. Also, various types of system programs, such as known analysis programs and so forth, are written to the ROM 12 in advance.

The interface 15 is an interface that connects the CPU 11 of the control device 1 and the external equipment 72 such as a USB device or the like. Machining programs, various parameters, and so forth, used for control of the machine tool, for example, can be read in from the external equipment 72 side. Also, machining programs, various parameters, and so forth, edited in the control device 1, can be stored in external storage means (omitted from illustration) via the external equipment 72.

A PLC (programmable logic controller) 16 outputs signals to and controls the machine tool and peripheral devices of the machine tool (e.g., tool exchanging devices, actuators such as robots or the like, sensors attached to the machine tool, and so forth) via an I/O unit 17, by a sequence program embedded in the control device 1. In the control device 1 according to the present embodiment, a sensor 3 that measures a load applied on a spindle during machining, for example, is connected via the I/O unit 17. Also, signals from various types of switches on a console panel disposed on a main unit of an industrial machine, peripheral devices, and so forth, are received, subjected to necessary signal processing, and thereafter handed to the CPU 11.

Various types of data read into memory, data acquired as a result of executing machining programs, system programs, and so forth, are output via an interface 18 and displayed on a display device 70. Also, the input device 71 made up of a keyboard, pointing device, and so forth, hands commands based on operations performed by a worker, data, and so forth, to the CPU 11 via an interface 19.

A shaft control circuit 30 for controlling a shaft that is included in the machine tool receives a control command value regarding the shaft from the CPU 11, and outputs this command to a servo amplifier 40. The servo amplifier 40 receives this command and drives a servo motor 50 that moves a drive portion included in the machine tool along the shaft. The servo motor 50 of the shaft has a built-in position-speed detector and performs feedback of position-speed feedback signals from this position-speed detector to the shaft control circuit 30, thereby performing position-speed feedback control. Note that although only one each of the shaft control circuit 30, the servo amplifier 40, and the servo motor 50 is illustrated in the hardware configuration diagram in FIG. 1, in reality there are as many prepared as the number of shafts included in the machine tool that is the object of control. For example, in a case of controlling a general machine tool, three sets of the shaft control circuit 30, the servo amplifier 40, and the servo motor 50 are prepared that move the spindle to which a tool is attached and the work relative to the linear triaxial (X axis, Y axis, Z axis) directions.

A spindle control circuit 60 receives a spindle rotation command, and outputs a spindle speed signal to a spindle amplifier 61. The spindle amplifier 61 receives this spindle speed signal, and rotates a spindle motor 62 of the machine tool at the commanded rotation speed, thereby driving the tool. A position encoder 63 is linked to the spindle motor 62, the position encoder 63 outputs feedback pulses synchronously with the rotation of the spindle, and the feedback pulses are read by the CPU 11.

Figure 2:
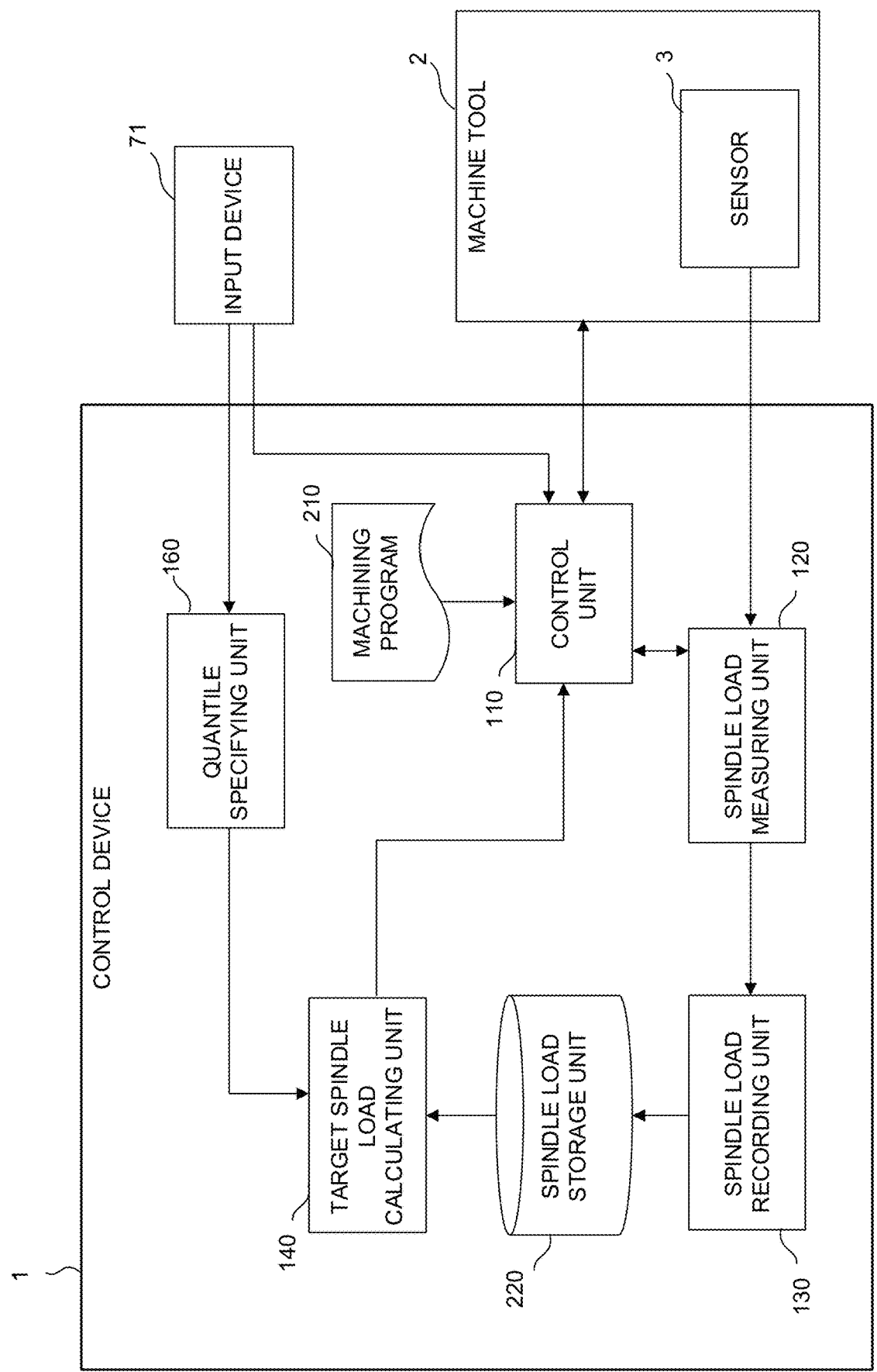
FIG. 2 is a schematic functional block diagram of a control device according to a first embodiment.

FIG. 2 is a representation of functions that the control device 1 according to a first embodiment of the present invention has, as a schematic block diagram. The functions that the control device 1 according to the present embodiment has are realized by the CPU 11 included in the control device 1 illustrated in FIG. 1 executing the system program, and controlling operations of each of the units of the control device 1.

The control device 1 according to the present embodiment includes a control unit 110, a spindle load measuring unit 120, a spindle load recording unit 130, a target spindle load calculating unit 140, and a quantile specifying unit 160. Also, a machining program 210 acquired from the input device 71, the external equipment 72, or the like, is stored in the RAM 13 or the nonvolatile memory 14 of the control device 1 in advance. Further, a spindle load storage unit 220 that is a region for storing the measured spindle load is prepared in the RAM 13 or the nonvolatile memory 14 of the control device 1 in advance.

The control unit 110 is realized by the CPU 11 that the control device 1 illustrated in FIG. 1 includes executing the system program read out from the ROM 12, primarily by the CPU 11 performing computing processing using the RAM 13 and the nonvolatile memory 14, and performing control processing of the units of a machine tool 2 using the shaft control circuit 30, the spindle control circuit 60, and the PLC 16. The control unit 110 analyzes the machining program 210 and creates command data for controlling the machine tool 2 and peripheral devices such as the sensor 3 and so forth. The control unit 110 then controls the units of the machine tool 2 on the basis of the created command data. The control unit 110 generates data relating to movement of shafts on the basis of commands for moving the shafts of the machine tool 2, for example, and outputs the data to the servo motor 50. Also, the control unit 110 generates data relating to rotation of the spindle on the basis of a command to rotate the spindle of the machine tool 2 for example, and outputs to the spindle motor 62. Further, the control unit 110 generates predetermined signals to operate peripheral devices of the machine tool 2 for example, on the basis of commands for operating the peripheral devices, and outputs to the PLC 16. Moreover, the control unit 110 acquires the state (motor current value, position speed, acceleration, torque, etc.) of the servo motor 50 and the spindle motor 62 as feedback values, which are used for each control processing.

The control unit 110 included in the control device 1 according to the present embodiment controls the feed speed of the spindle (relative feed speed between the spindle and the work) in a case in which a target spindle load indicating a target value for the spindle load is input from the target spindle load calculating unit 140, such that the spindle load becomes the target spindle load. The control unit 110 also instructs the spindle load measuring unit 120 of starting/ending of measurement of the load applied on the spindle, on the basis of commands from blocks of the machining program 210, commands input by an operator at the input device 71, and so forth.

The spindle load measuring unit 120 is realized by the CPU 11 that the control device 1 illustrated in FIG. 1 includes executing the system program read out from the ROM 12, primarily by the CPU 11 performing computing processing using the RAM 13 and the nonvolatile memory 14, and performing control processing of the units of the machine tool 2 using the PLC 16. The spindle load measuring unit 120 commands the sensor 3 to measure the load applied on the spindle that the machine tool 2 is equipped with, and acquires the measurement results thereof. The spindle load measuring unit 120 may acquire the load applied on the spindle as a set (time-series data) of values measured at a predetermined cycle in time-sequence, for example. The value of the load applied on the spindle that the spindle load measuring unit 120 acquires may be expressed by a predetermined unit of load (Nm, etc.), or may be expressed as a proportion of load (% of parts per hundred, etc.) measured, as to the continuous rated load value of the motor to move the spindle relative to the work. The set of values of load applied on the spindle that the spindle load measuring unit 120 has acquired is output to the spindle load recording unit 130.

The spindle load recording unit 130 is realized by the CPU 11 that the control device 1 illustrated in FIG. 1 includes executing the system program read out from the ROM 12, primarily by the CPU 11 performing computing processing using the RAM 13 and the nonvolatile memory 14. The spindle load recording unit 130 records the set of values of load applied on the spindle that the spindle load measuring unit 120 has acquired in the spindle load storage unit 220. The spindle load recording unit 130 may store the set of values of load applied on the spindle that the spindle load measuring unit 120 has acquired in the spindle load storage unit 220 as it is. Alternatively, the spindle load recording unit 130 may create a frequency distribution of values of the load applied on the spindle, on the basis of the set of values of the load applied on the spindle that are acquired by the spindle load measuring unit 120, and record the data regarding the created frequency distribution in the spindle load storage unit 220. The spindle load recording unit 130 may also store results of simulation of the load applied on the spindle, carried out by means omitted from illustration, in the spindle load storage unit 220.

In a case of recording the set of values of load applied on the spindle as data relating to frequency distribution, predetermined classes obtained by sectioning a range of values that load applied on the spindle can assume, are set in advance. The spindle load recording unit 130 then calculates the frequency regarding each piece of data included in the set of values of load applied on the spindle that the spindle load measuring unit 120 has acquired, for each of the above classes, on the basis of the load value thereof, thereby creating the frequency distribution.

For example, in a case in which the values of load applied on the spindle are expressed as the proportion as to the continuous rated load value of the motor such as described above, and the values of the load applied on the spindle can assume values of 0% to 150%, the range of the values of the load applied on the spindle are sectioned into 151 classes, such as data of a load value not less than 0% and less than 1% being 0%, data of a load value not less than 1% and less than 2% being 1%, and so on. Which class each piece of data included in the set of values of load applied on the spindle that the spindle load measuring unit 120 has acquired belongs to is determined, and the count of pieces of data belonging to each class is calculated as frequency, thereby creating the frequency distribution.

Figure 3:
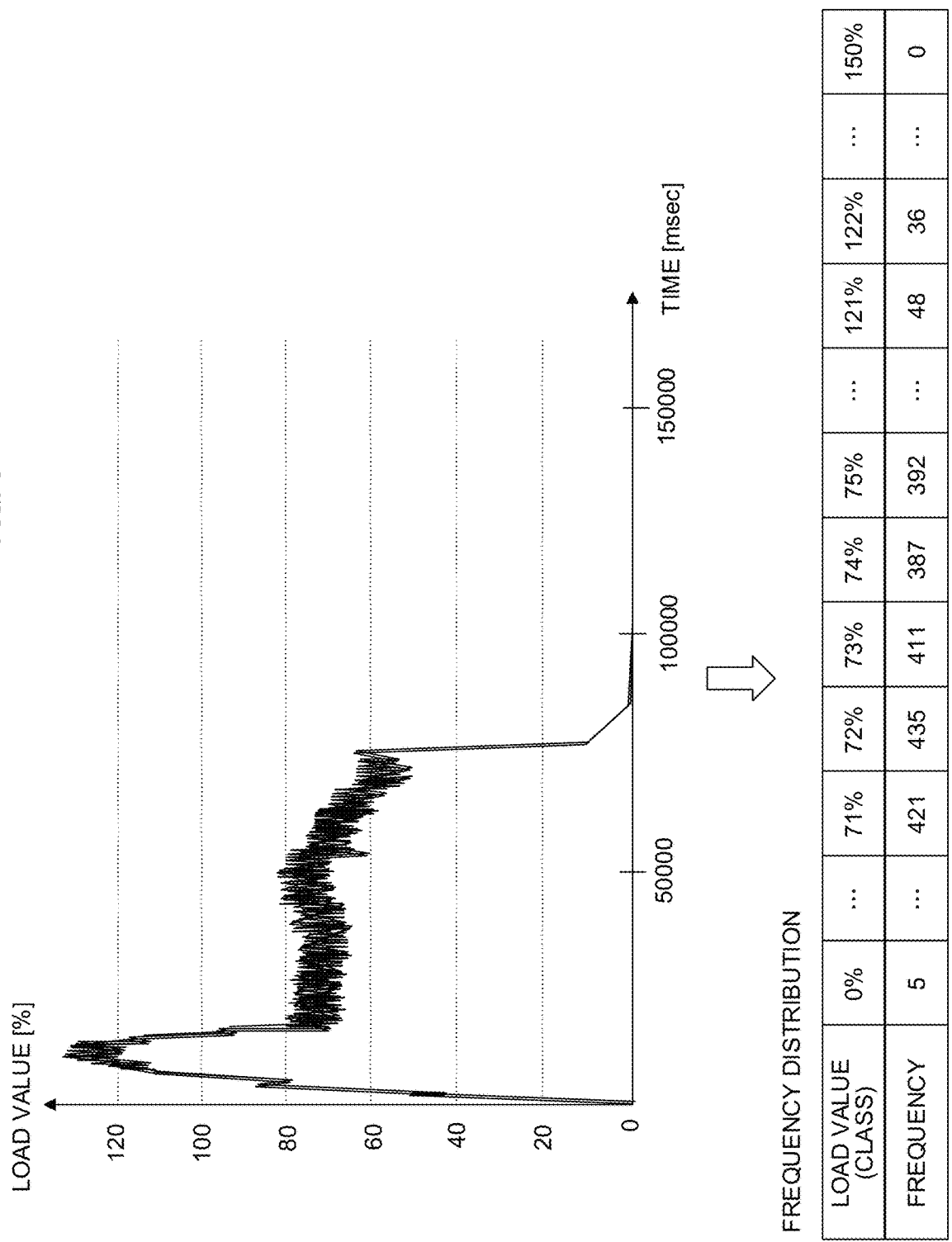
FIG. 3 is a diagram showing an example of a frequency distribution of values of load applied on a spindle.

FIG. 3 shows an example of the spindle load recording unit 130 creating a frequency distribution of values of load applied on the spindle. In the example in FIG. 3, the unit of values of load applied on the spindle is expressed as the proportion as to the continuous rated load area. Also, assumption is made that the spindle load measuring unit 120 is measuring the load on the spindle every 10 msec. Further, assumption will be made that the range of values of the load applied on the spindle is sectioned by each 1% into 151 classes, as described above. At this time, the spindle load measuring unit 120 determines to which class each of 10,001 pieces of data acquired from time 0 [ms] to 100,000 [ms] belongs to, and calculates the count of data belonging to each class to create the frequency distribution. In the load values data exemplified in FIG. 3, the frequencies in the classes of load values 60% to 80% exhibit a relatively great value, and the frequencies of other classes are small.

The target spindle load calculating unit 140 is realized by the CPU 11 that the control device 1 illustrated in FIG. 1 includes executing the system program read out from the ROM 12, primarily by the CPU 11 performing computing processing using the RAM 13 and the nonvolatile memory 14. The target spindle load calculating unit 140 calculates a predetermined quantile specified by the quantile specifying unit 160 in the data stored in the spindle load storage unit 220 as the target spindle load. In a case in which a set of values of load applied on the spindle is stored as data in the spindle load storage unit 220, the target spindle load calculating unit 140 can rearrange the individual pieces of data in ascending order or reverse order, calculate cumulative frequency from below, and thereupon calculate the quantile at the specified quantile. Also, in a case in which frequency distribution of values of load applied on the spindle is stored as data in the spindle load storage unit 220, the target spindle load calculating unit 140 can calculate cumulative frequency for each class from below, and calculate the quantile at the specified quantile. The target spindle load calculating unit 140 outputs the calculated quantile to the control unit 110 as the target spindle load.

Figure 4:
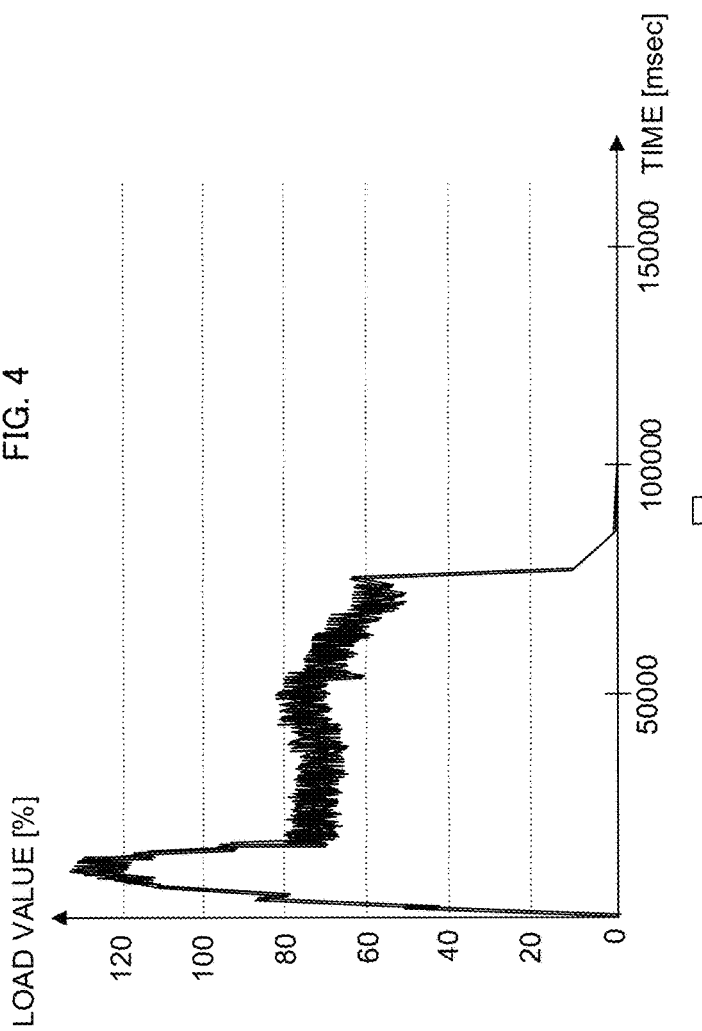
FIG. 4 is a diagram showing an example of quantile calculation.

FIG. 4 is a diagram showing a method for finding a ½ quantile from the data of the frequency distribution exemplified in FIG. 3. As exemplified in FIG. 4, in a case in which the ½ quantile is specified in advance, for example, cumulative frequency is calculated from below on the basis of the data in the frequency distribution, and the value indicating the class containing the 5001'th piece of data is calculated as the ½ quantile. In the case in FIG. 4, the target spindle load calculating unit 140 outputs 74%, which is the ½ quantile, to the control unit 110 as the target spindle load.

Figure 5:
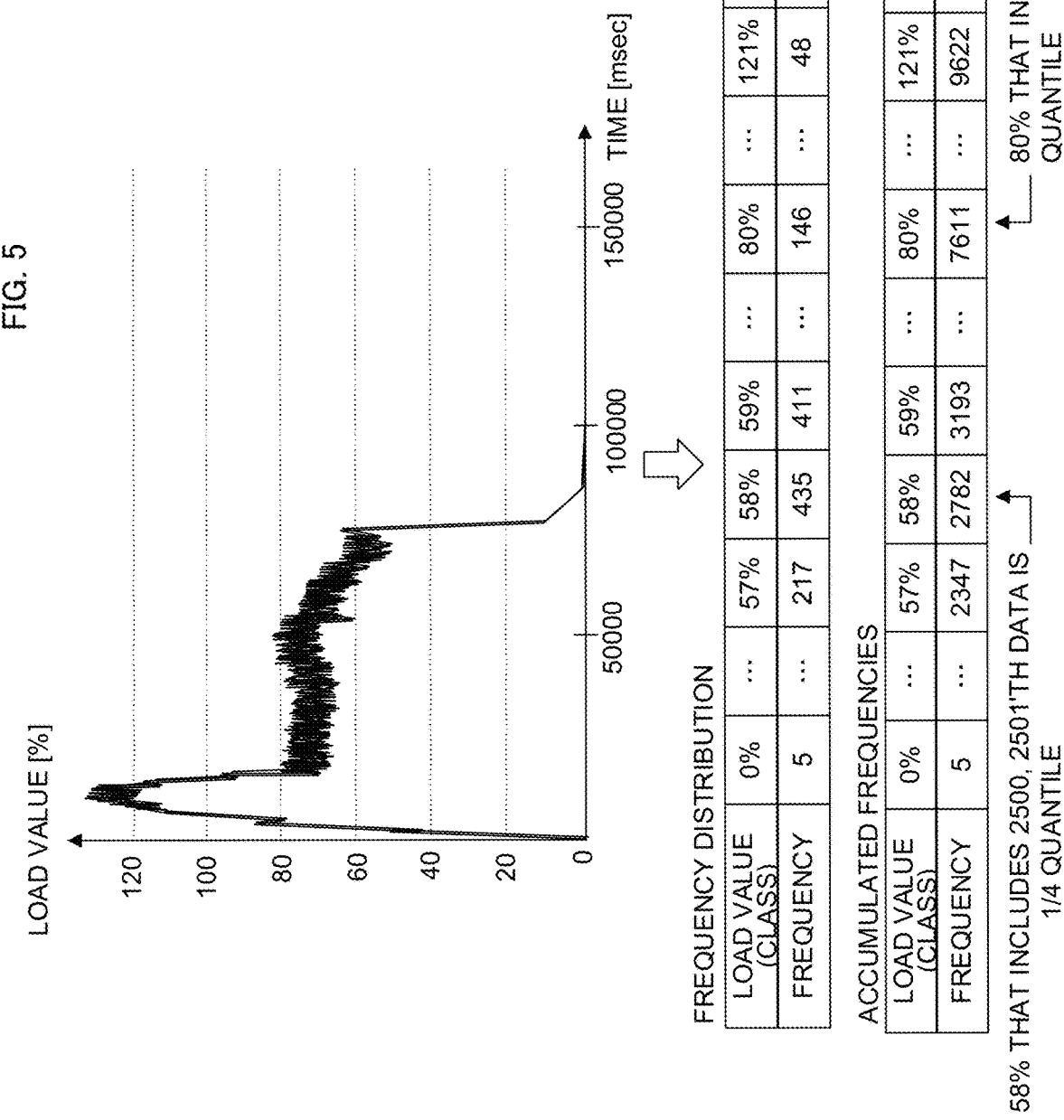
FIG. 5 is a diagram showing another example of quantile calculation.

The control device 1 according to the present embodiment can adjust the target spindle load by changing the quantile that is specified in accordance with the object of machining. FIG. 5 shows an example of calculating the target spindle load in a case in which ¼ quantile or ¾ quantile is specified by the operator. For example, in a case in which cycle time is to be sacrificed to extend tool life, the operator commands the target spindle load calculating unit 140 to calculate ¼ quantile as the target spindle load, from the input device 71 or the like. In this case, the target spindle load calculating unit 140 calculates the values of the class including the 2500'th and 2501'th data from below in the set of values of load applied on the spindle as the ¼ quantile. In the example in FIG. 5, the target spindle load calculating unit 140 outputs 58%, which is the ¼ quantile, to the control unit 110 as the target spindle load. Conversely, in a case in which tool life is to be sacrificed to speed up cycle time, the operator commands the target spindle load calculating unit 140 to calculate ¾ quantile as the target spindle load, from the input device 71 or the like. In this case, the target spindle load calculating unit 140 calculates the values of the class including the 7500'th and 7501'th data from below in the set of values of load applied on the spindle as the ¾ quantile. In the example in FIG. 5, the target spindle load calculating unit 140 outputs 80%, which is the ¾ quantile, to the control unit 110 as the target spindle load. Note that in a case in which the specified quantile spans classes, the average value of the values corresponding to these classes can be taken as the target spindle load.

The quantile specifying unit 160 is realized by the CPU 11 that the control device 1 illustrated in FIG. 1 includes executing the system program read out from the ROM 12, primarily by the CPU 11 performing computing processing using the RAM 13 and the nonvolatile memory 14, and performing input processing using the interface 19. The quantile specifying unit 160 accepts specification input of quantile from the operator, and outputs to the target spindle load calculating unit 140. The quantile specifying unit 160 may accept direct specification input of quantile, such as ½ quantile, ¾ quantile, and so forth, or may accept specification input in the form of percentile, such as 30%, 50%, 70%, or the like. Also, besides accepting specification of quantile from the input device 71, a quantile set in a setting region provided in the nonvolatile memory 14 of the control device 1 may be accepted as the specified quantile, or a quantile received from another computer, such as a host computer or the like, via a network that is omitted from illustration, may be accepted as the specified quantile.

In a case of using the control device 1 according to the present embodiment that has the above configuration, the operator measures the load applied on the spindle while performing test machining. Simply specifying a predetermined quantile with respect to the set of values of the load acquired through measurement then automatically sets the target spindle load. Enabling the quantile to be specified with respect to values of the load applied on the spindle, as described above, facilitates extracting a value of a load measured a great number of times out of the loads applied on the spindle, measured during the test machining. The load applied on the spindle may not be a constant value even when machining the work at the same spindle rotational speed, the same feed speed, and the same cut depth, due to vibrations of the spindle, the way in which the tool edge comes into contact with the work, and so forth. Accordingly, finding a stable machining portion is difficult when simply using a modal value or the like. The control device 1 according to the present embodiment enables specifying distributions with respect to a set of measured values of load applied on the spindle, whereby identifying a portion at which load values with relatively great frequency are concentrated as a stable machining portion is facilitated. Predetermined distributions can then be specified with this stable machining portion as a reference, enabling specification in accordance with the object of the machining to be easily specified, such as machining with emphasis on cycle time, or machining with emphasis on tool life.

In the control device 1 according to the present embodiment, the set of values of load applied on the spindle may be stored in the spindle load storage unit 220 as it is, but storing such data as frequency distribution data enables the necessary data storage capacity to be markedly reduced as compared to a case of recording the set of values of load applied on the spindle acquired by the spindle load measuring unit 120 as it is. Also, calculating the frequency distribution in advance enables calculation to be simplified at the time of performing calculation regarding quantiles.

As a modification of the control device 1 according to the present embodiment, the quantile specifying unit 160 may be settable regarding specification of quantiles by the operator using radio buttons, pull-down menus, or the like. A menu including, for example, "priority on cycle time", "priority on balance" "priority on tool life", and so forth may be selectable at this time, and when each item is selected, the quantile corresponding to the selected item may be specified. By providing such a configuration, the operator can specify a predetermined quantile simply by specifying their object.

Figure 6:
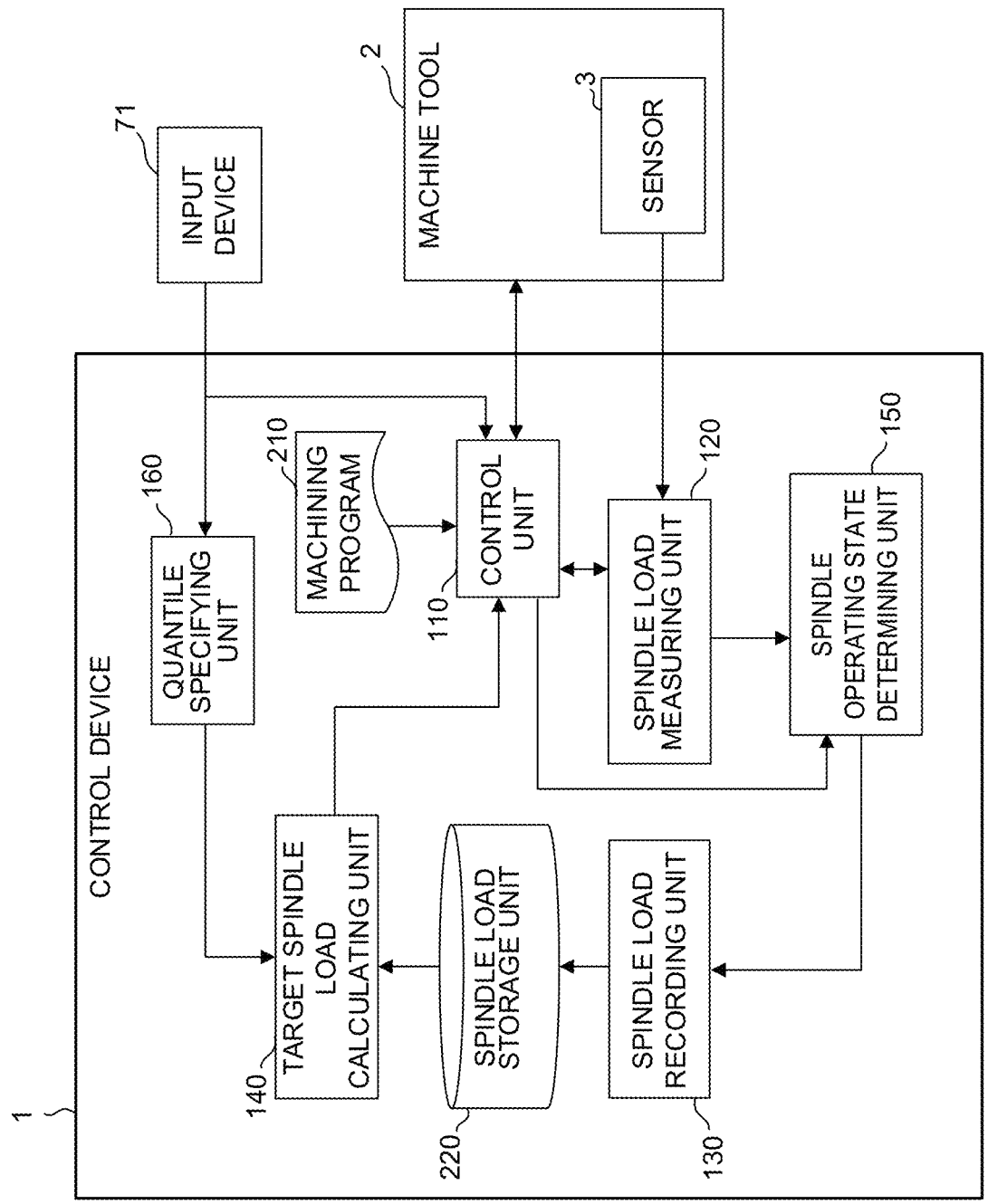
FIG. 6 is a schematic functional block diagram of a control device according to a second embodiment.
Figure 7:
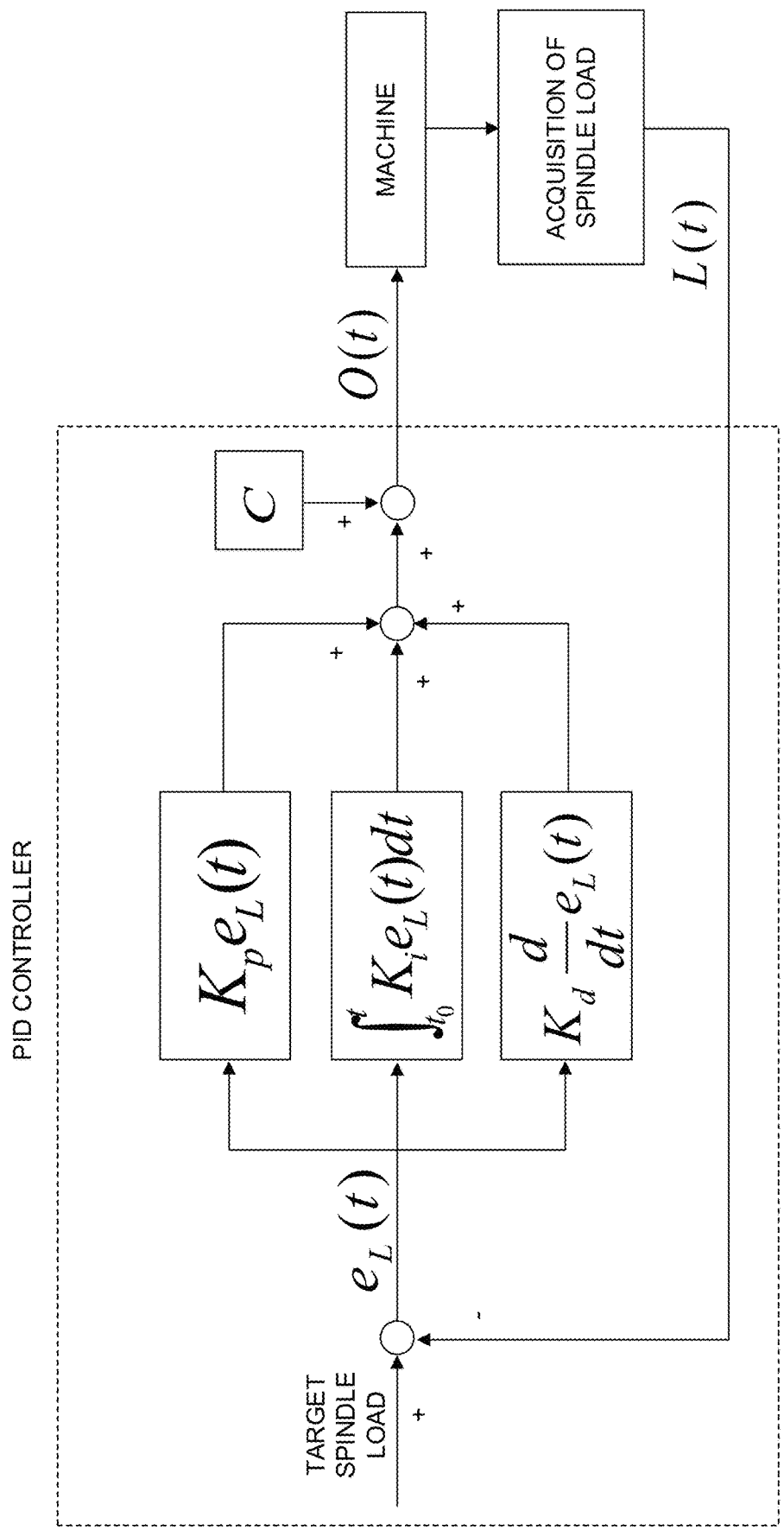
FIG. 7 is a diagram illustrating an example of a block diagram of PID control according to conventional art.

FIG. 6 is a schematic block diagram illustrating functions of the control device 1 according to a second embodiment of the present invention. The functions that the control device 1 according to the present embodiment has are realized by the CPU 11 included in the control device 1 illustrated in FIG. 1 executing the system program, and controlling operations of each of the units of the control device 1.

The control device 1 according to the present embodiment further includes a spindle operating state determining unit 150 in addition to the control unit 110, the spindle load measuring unit 120, the spindle load recording unit 130, and the target spindle load calculating unit 140. Also, the machining program 210 acquired from the input device 71, the external equipment 72, or the like, is stored in the RAM 13 or the nonvolatile memory 14 of the control device 1 in advance. Further, the spindle load storage unit 220 that is a region for storing the measured spindle load is prepared in the RAM 13 or the nonvolatile memory 14 of the control device 1 in advance.

The control unit 110, the spindle load measuring unit 120, and the spindle load recording unit 130 included in the control device 1 according to the present embodiment have functions the same as the functions that the control device 1 according to the first embodiment has.

The spindle operating state determining unit 150 is realized by the CPU 11 that the control device 1 illustrated in FIG. 1 includes executing the system program read out from the ROM 12, primarily by the CPU 11 performing computing processing using the RAM 13 and the nonvolatile memory 14. The spindle operating state determining unit 150 determines the operating state of the spindle, such as whether accelerating/decelerating or stopped, for example, on the basis of information that can be acquired from the control unit 110, and commands the spindle load recording unit 130 not to record the spindle load measured while accelerating/decelerating or stopped. Whether the spindle is accelerating/decelerating, or stopped, can be determined from the state of execution of the machining program 210 by the control unit 110. For example, immediately after a normal rotation command (reverse rotation command), stop command, rotational speed command, or the like is executed and the rotational speed of the spindle is changed, rotation of the spindle accelerates or decelerates, and the load on the spindle is high even in a state in which no machining is being performed. In such a state, the spindle can be determined to be accelerating/decelerating. Also, in a case of a sufficient amount of time elapsing from a stop command being executed, the spindle can be determined to be stopped.

Including the value of the load applied on the spindle measured when accelerating/decelerating or stopped in the calculation of the target spindle load results in the target spindle load being high or being low. The control device 1 according to the present embodiment having the above configuration can exclude the load applied on the spindle measured when the spindle is accelerating/decelerating or the spindle is stopped from the calculation of the target spindle load, and accordingly, setting of a more appropriate target spindle load is anticipated.

Although an embodiment of the present invention has been described above, the present invention is not limited to the example of the above-described embodiments alone, and can be carried out in various forms by applying various modifications as appropriate.

The invention claimed is:

1. A control device that adjusts a feed speed on the basis of a load applied on a spindle when machining a work, the control device comprising:
   a spindle load storage unit that stores data relating to the load applied on the spindle;
   a quantile specifying unit that specifies a predetermined quantile;
   a target spindle load calculating unit that calculates the quantile specified by the quantile specifying unit, in the data relating to the load applied on the spindle stored in the spindle load storage unit, as a target spindle load;
   a spindle load measuring unit that measures the load applied on the spindle; and
   a control unit that controls the feed speed of the spindle as to the work, so that the load applied on the spindle is the target spindle load.

2. The control device according to claim 1, wherein the target spindle load calculating unit calculates the target spindle load on the basis of a cumulative frequency calculated by accumulating frequencies of values of the load applied on the spindle that are stored in the spindle load storage unit, in order from small values, and the quantile specified by the quantile specifying unit.

3. The control device according to claim 1, further comprising:
   a spindle load recording unit that sections values that the load applied on the spindle can assume into a plurality of classes, calculates a frequency distribution in which the loads measured by the spindle load measuring unit are counted as corresponding to the class thereof, and performs recording thereof in the spindle load storage unit.

4. The control device according to claim 1, further comprising:
   a spindle operating state determining unit that commands the spindle load storage unit not to store the load applied on the spindle in a case in which the spindle is accelerating/decelerating or stopped.

5. The control device according to claim 1, wherein the quantile specifying unit decides a quantile to specify on the basis of selection of an option indicating a target relating to the machining.

* * * * *